(12) United States Patent
Tezuka et al.

(10) Patent No.: US 6,853,815 B2
(45) Date of Patent: Feb. 8, 2005

(54) IMAGE FORMING APPARATUS AND ADJUSTMENT METHOD OF THE SAME

(75) Inventors: Hiroki Tezuka, Kanagawa (JP); Yoichiro Maebashi, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/235,894

(22) Filed: Sep. 6, 2002

(65) Prior Publication Data
US 2003/0049040 A1 Mar. 13, 2003

(30) Foreign Application Priority Data

Sep. 10, 2001 (JP) ......................................... 2001-273508
Sep. 28, 2001 (JP) ......................................... 2001-301639

(51) Int. Cl.[7] .......................... G03G 15/01; G03G 15/00; H04N 1/40
(52) U.S. Cl. ......................... 399/39; 358/448; 358/461; 399/49
(58) Field of Search ............................... 399/49, 39, 40, 399/41, 46; 358/3.01, 3.03, 3.06, 448, 461

(56) References Cited

U.S. PATENT DOCUMENTS

| | | | | |
|---|---|---|---|---|
| 5,604,567 A | * | 2/1997 | Dundas et al. ................ | 399/39 |
| 5,963,756 A | | 10/1999 | Sakai et al. .................... | 399/39 |
| 6,008,907 A | * | 12/1999 | Vigneau et al. ......... | 358/448 X |
| 6,070,022 A | | 5/2000 | Kobayashi et al. ........... | 399/12 |
| 6,075,621 A | * | 6/2000 | Takeuchi et al. ............. | 358/461 |
| 6,148,158 A | * | 11/2000 | Amemiya ..................... | 399/39 |
| 6,172,771 B1 | | 1/2001 | Ikeda et al. ................... | 358/406 |
| 6,185,386 B1 | | 2/2001 | Noguchi et al. ............... | 399/49 |
| 6,215,562 B1 | | 4/2001 | Michel et al. ................ | 358/1.9 |
| 6,450,606 B1 | * | 9/2002 | Kato et al. ................. | 399/49 X |

FOREIGN PATENT DOCUMENTS

WO            93/20648            10/1993

* cited by examiner

Primary Examiner—Sandra Brase
(74) Attorney, Agent, or Firm—Fitzpatrick, Cella, Harper & Scinto

(57) ABSTRACT

In a color image forming apparatus, a color toner patch for controlling density or chromaticity may be detected by a color sensor and fed back to process conditions so as to control density or chromaticity of a final output image.

However, a white reference board for proofreading sensor output is expensive, and may have paper powder, toner or ink scattered thereon to become no longer usable as a reference board.

The present invention provides a color identification method and a color image forming apparatus exploitable for density or chromaticity control by using a color sensor without using the reference board.

In the present invention, a gray patch of black and a process gray patch of yellow, magenta and cyan are formed on a transfer medium, the chromaticity is detected without using a criterion for sensor output proofreading, and relative comparison is made between the chromaticities detected from the above two types of gray patches by using as a standard the gray patch of black which is almost achromatic, and if the chromaticities are consistent with each other, the process gray patch is judged to be achromatic.

33 Claims, 13 Drawing Sheets

FIG. 12A

| PATCH | GRADATIONS | | | PATCH TO BE USED | |
|---|---|---|---|---|---|
| | C | M | Y | CHART A | CHART B |
| 1 | 100 | 100 | 100 | ○ | ○ |
| 2 | 115 | 115 | 115 | | ○ |
| 3 | 85 | 115 | 115 | | ○ |
| 4 | 115 | 85 | 115 | | ○ |
| 5 | 115 | 115 | 85 | | ○ |
| 6 | 85 | 85 | 115 | | ○ |
| 7 | 85 | 115 | 85 | | ○ |
| 8 | 115 | 85 | 85 | | ○ |
| 9 | 85 | 85 | 85 | | ○ |

FIG. 12B

| PATCH | GRADATIONS | PATCH TO BE USED | |
|---|---|---|---|
| | K | CHART A | CHART B |
| 1 | 100 | ○ | ○ |
| 2 | 115 | | ○ |
| 3 | 85 | | ○ |

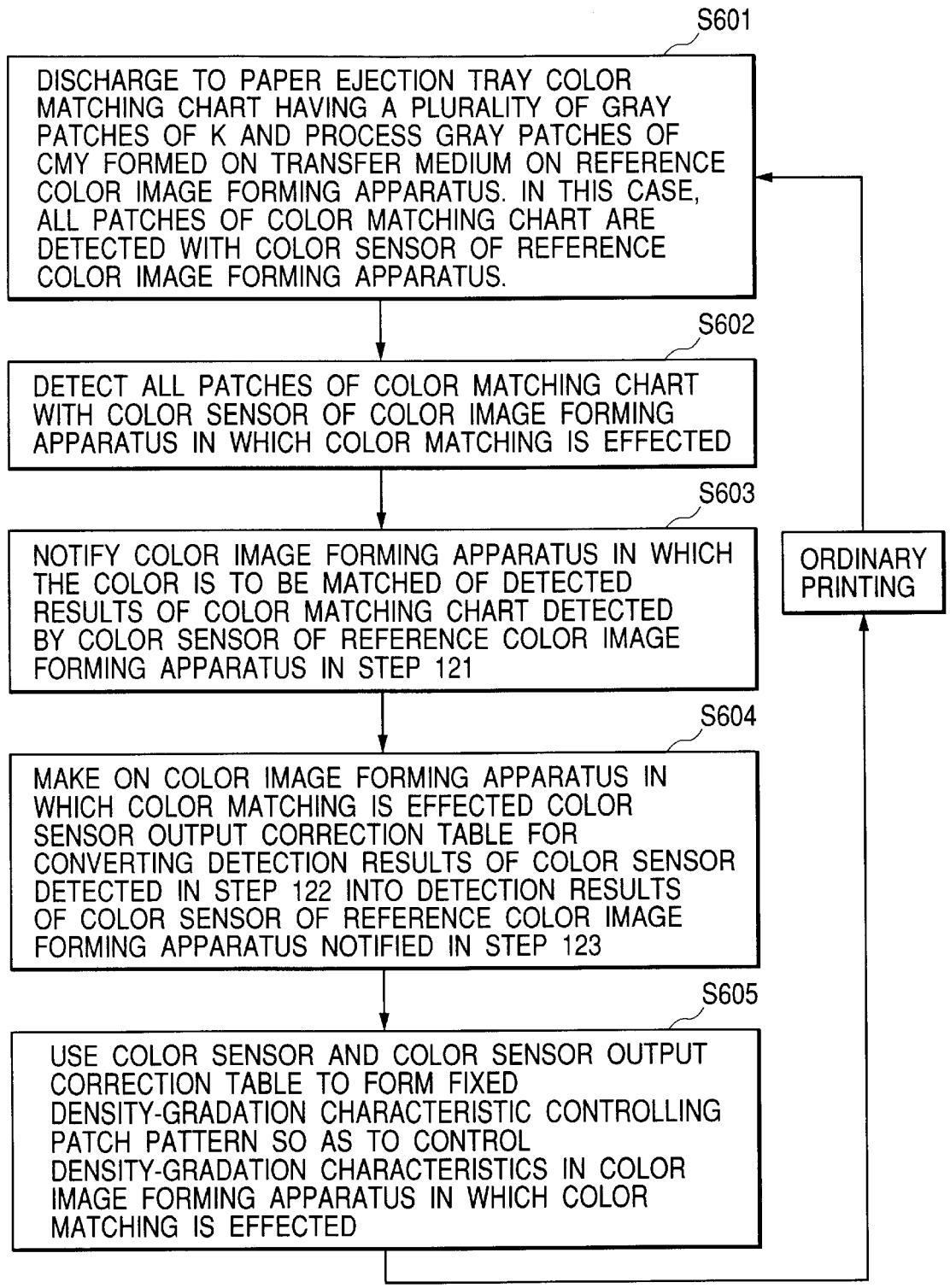

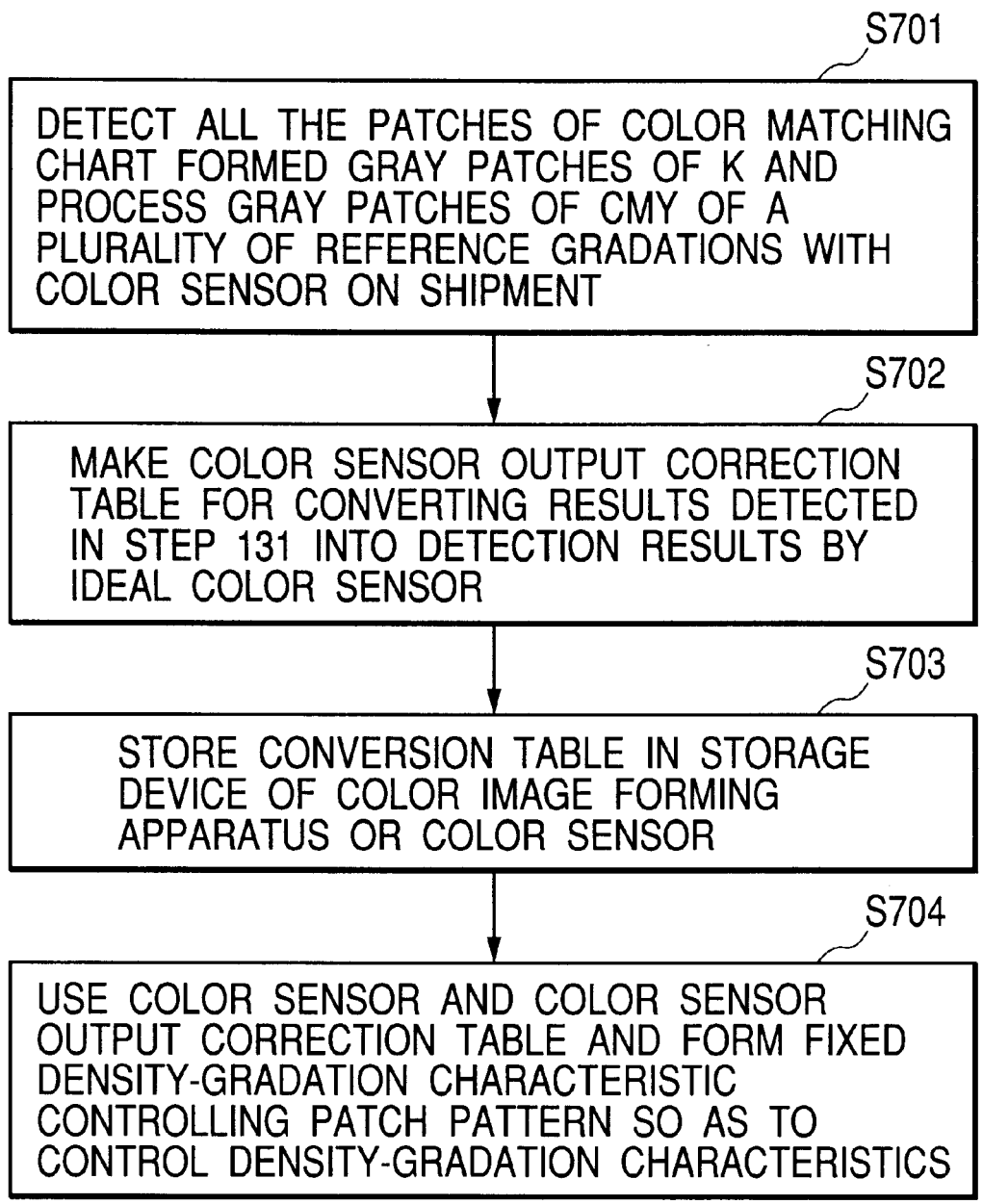

IMAGE FORMING APPARATUS AND ADJUSTMENT METHOD OF THE SAME

BACKGROUND OF THE INVENTION

1. Field of the Invention

The present invention relates to a color identification method for color image forming apparatuses such as a color printer and a color copier in an electrophotographic method, an ink jet method or the like, and an image forming apparatus for controlling an image processing portion by using information obtained by this color identification method.

2. Related Background Art

In recent years, higher quality of output images is required for color image forming apparatuses such as a color printer and a color copier adopting an electrophotographic method, an ink jet method or the like.

In particular, gradation in density and stability thereof have a great influence on judgement made by a human being as to whether an image is good or not.

As for the above described color image forming apparatuses, however, the density of the obtained image changes if portions of the apparatus change due to environmental change and long-time use.

In particular, in the case of the color image forming apparatus in the electrophotographic method, even a slight change in the density may cause a color balance to collapse so that it is necessary to always keep constant density-gradation characteristics.

Accordingly, for toner of each color, it has process conditions such as several kinds of exposure amounts and development biases according to absolute humidity and gradation correcting means such as a lookup table (LUT), and selects the process conditions at the time and an optimum value of gradation correction are selected on the basis of the absolute humidity measured by a temperature/humidity sensor.

In addition, it has a configuration wherein, to obtain the constant density-gradation characteristics even if change of each part of the apparatus takes place, a density detecting toner patch is created with the toner in each color on an intermediate transfer member, a drum or the like, and the density of the unfixed toner patch is detected by an unfixed toner density detecting sensor, so that density control is performed by feeding back the process conditions such as the exposure values and development bias from the detection results so as to obtain stable images.

However, in the density control using the unfixed toner density detecting sensor, the patch is formed on the intermediate transfer member, a drum or the like to detect the density, and control is not carried out on transfer to a transfer medium and change in the color balance of the image due to fixing.

The color balance also changes due to transfer efficiency in transferring a toner image to the transfer medium and due to heating and pressurization for fixing. This change cannot be handled by the density control using the unfixed toner density detecting sensor. Accordingly, an image forming apparatus has been devised which has a density or chromaticity detecting sensor for detecting the density of a monochromatic toner image or the chromaticity of a full color image on the transfer medium after the transfer and fixing (hereafter, referred to as a color sensor), forms a density or chromaticity controlling color toner patch (hereafter, referred to as a patch) on the transfer medium, feeds back the detected density or chromaticity to the process conditions such as the exposure amount, and lookup table (LUT), and performs density or chromaticity control of a final output image formed on the transfer medium.

In order to identify CMYK and detect the density or chromaticity, for instance, this color sensor uses light sources emitting light in red (R), green (G) and blue (B) as a light emitting device, or uses a light source emitting light in white (W) as a light emitting device and three types of filters which are formed on a photoreceptor and are different in spectral transmittance of red (R), green (G), blue (B), etc. It is possible to identify the CMYK and detect the density from the three different outputs obtained, for example, RGB outputs.

In addition, it is possible to mathematically process the RGB outputs by linear transformation and so on or convert it by the lookup table (LUT) so as to detect the chromaticity.

Also in a printer in the ink jet method, the color balance also changes due to a change in ink discharge over time, an environmental difference and individual differences in ink cartridges so that the density-gradation characteristics cannot be kept constant. Accordingly, it is devised to install the color sensor in the vicinity of an output portion of the printer so as to detect the density or chromaticity of the patch on the transfer medium and perform the density or chromaticity control.

There are various methods of controlling the density or chromaticity. For instance, a gamma characteristic is controlled from the measured density, or a color matching table and a color separation table are corrected from the measured chromaticity.

In order to detect the absolute density or the absolute chromaticity of the patch by using the color sensor, however, for the following reasons, a criterion is required in which the absolute value of the density or chromaticity of a sensor output proofreading white reference board or the like is known.

The first reason is that it is necessary to proofread variations in spectral characteristics of the light emitting devices and photoreceptors constituting the sensor.

The second reason is that even when the same patch is detected, the outputs may be different due to change over time in the light emitting portion and the photoreceptive portion of the sensor and change in ambient temperature.

The third reason is that a lot of transfer mediums pass through the vicinity of the sensor during normal printing, and so paper powder, toner or ink is scattered to accumulate or stick on the sensor surface, bringing about reduction in sensor output.

However, the white reference board which is often used as a criterion of sensor output proofreading is not only expensive but also possibly gets paper powder, toner or ink scattered thereon as in the sensor to become no longer usable as a reference board.

On the other hand, if the density or chromaticity of the patch is detected without using the criterion for the sensor output proofreading, that is, without proofreading the sensor output, the sensor outputs a value different from actual density or chromaticity of the patch when affected by the above reason.

If the density or chromaticity is controlled by using the results, no color balance is achieved and desired density-gradation characteristics cannot be obtained. In addition, in some cases, the color balance is further lost and the density-gradation characteristics deteriorate.

SUMMARY OF THE INVENTION

An object of the present invention is, in a color identification method for color image forming apparatus, to make it possible to determine by using a color sensor that a process gray patch is an achromatic color, and if it is an achromatic color, to detect which gradation of black it is equivalent to in lightness without using a criterion for sensor output proofreading, so as to be sufficiently exploitable for density or chromaticity control even though absolute chromaticity cannot be detected.

Another object is to improve color reproducibility between a plurality of color image forming apparatuses.

To achieve the above objects, the present invention provides an image forming apparatus comprising:

an image forming means for forming images out of an achromatic colorant and a plurality of chromatic colorants and superimposing the images to form a color image;

a means for having the image forming means form a gray patch out of a chromatic colorants and a gray patch out of the achromatic colorant;

a detecting means for detecting chromaticity of the gray patch formed out of the chromatic colorants and chromaticity of the gray patch formed out of the achromatic color colorant by using a color sensor; and a controlling means for controlling image forming conditions for the image forming means on the basis of those detection results.

The present invention also provides an adjustment method for an image forming apparatus forming images out of an achromatic colorant and a plurality of chromatic colorants and superimposing the images to form a color image, comprising:

a step of having an image forming apparatus form a gray patch out of the chromatic colorants and a gray patch out of the achromatic colorant;

a step of detecting chromaticity of the gray patch formed out of the chromatic colorants and chromaticity of the gray patch formed out of the achromatic colorant by using a color sensor included in the image forming apparatus; and a step of controlling image forming conditions for the image forming means on basis of those detection results.

The present invention further provides an adjustment method for a plurality of image forming apparatuses forming images out of an achromatic colorant and a plurality of chromatic colorants and superimposing the images to form a color image, comprising:

a step of having a reference image forming apparatus form a gray patch out of the chromatic colorants and a gray patch out of the achromatic colorant;

a step of detecting chromaticity of the gray patch formed out of the chromatic colorants and chromaticity of the gray patch formed out of the achromatic colorant respectively on the reference image forming apparatus by using a color sensor included in another image forming apparatus;

a step of having the other image forming apparatus form the gray patch out of the chromatic colorants and the gray patch out of the achromatic colorant;

a step of detecting chromaticity of the gray patch formed out of the chromatic colorants and chromaticity of the gray patch formed out of the achromatic colorant respectively on the other image forming apparatus by using the color sensor included in the other image forming apparatus; and a step of adjusting image forming conditions for said other image forming apparatus on the basis of the detection results of the detecting steps.

The present invention still further provides an adjustment method of the image forming apparatus, comprising:

a step of detecting the chromaticity of a reference patch by using the color sensor included in the image forming apparatus; and a correcting step of correcting an output table of the color sensor on the basis of the detected chromaticity.

Other objects, configurations and effects of the present invention will be clear from the following detailed description and accompanying drawings.

BRIEF DESCRIPTION OF THE DRAWINGS

FIG. 12A is a table explaining color matching charts A and B;

FIG. 12B is a table explaining color matching charts A and B;

FIG. 13 is a flowchart showing control in a sixth embodiment;

FIG. 14 is a flowchart showing control in a seventh embodiment; and

DESCRIPTION OF THE PREFERRED EMBODIMENTS

The present invention will be described below on the basis of embodiments.

First Embodiment

Figure 1:
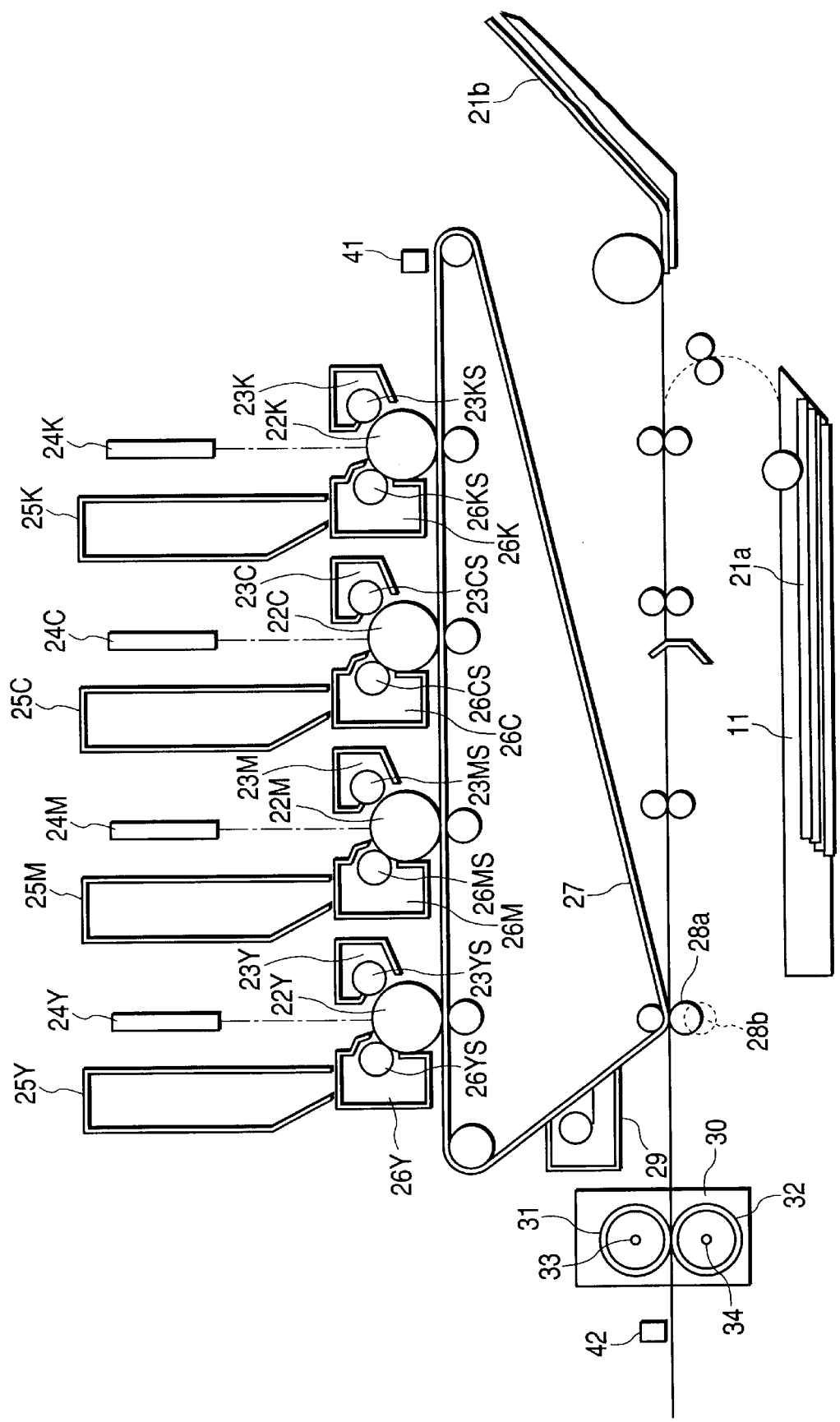
FIG. 1 is a block diagram of a color image forming apparatus to be used for describing a first embodiment of the present invention.

FIG. 1 is a block diagram showing a tandem-method color image forming apparatus adopting an intermediate transfer member 27 as an example of the color image forming apparatus in an electrophotographic method.

Operation of the color image forming apparatus in the electrophotographic method will be described by using FIG. 1.

In an image forming portion shown in FIG. 1, the color image forming apparatus forms an electrostatic latent image with exposure light controlled by an image processing portion (not shown) on the basis of an image signal, develops this electrostatic latent image to form a monochromatic toner image, superimposes this monochromatic toner image to form a multicolor toner image, transfers this multicolor toner image to a transfer element 11 to fix the multicolor toner image thereon, where the above described image forming portion is comprised of a sheet feeding portion 21, photosensitive members (hereafter, referred to as photosensitive drums) 22Y, 22M, 22C and 22K for each of the stations arranged according to each development color, injection chargers 23Y, 23M, 23C and 23K constituting injection charging means as primary charging means, toner cartridges 25Y, 25M, 25C and 25K, developing devices 26Y, 26M, 26C and 26K constituting developing means, the intermediate transfer member 27, a transfer roller 28 and a fixing portion 30.

The above described photosensitive drums 22Y, 22M, 22C and 22K are constituted of an aluminum cylinder the outer periphery of which is coated with an organic photoconductive layer, and rotated by driving force of a drive motor (not shown), where the drive motor rotates the photosensitive drums 22Y, 22M, 22C and 22K counterclockwise according to image forming operation.

Four injection chargers 23Y, 23M, 23C and 23K for charging the photosensitive drums of yellow (Y), magenta (M), cyan (C) and black (K) are provided to each station as primary charging means, and the injection chargers have sleeves 23YS, 23MS, 23CS and 23KS.

The exposure light for the photosensitive drums 22Y, 22M, 22C and 22K is sent from scanner portions 24Y, 24M, 24C and 24K, and the electrostatic latent image is formed by selectively exposing the surface of the photosensitive drums 22Y, 22M, 22C or 22K.

The developing means is constituted so that each station has the four developing devices 26Y, 26M, 26C and 26K for performing development of yellow (Y), magenta (M), cyan (C) and black (K) in order to visualize the above described electrostatic latent image, and the developing devices have sleeves 26YS, 26MS, 26CS and 26KS. Each developing device is detachably mounted.

The intermediate transfer member 27 is in contact with the photosensitive drums 22Y, 22M, 22C or 22K, and rotates clockwise when forming a color image to rotate in conjunction with rotation of the photosensitive drums 22Y, 22M, 22C or 22K so as to have the monochromatic toner image transferred.

The transfer roller 28 described later comes into contact with the intermediate transfer member 27 to sandwich therebetween and carry the transfer medium 11 so as to transfer the multicolor toner image on the intermediate transfer member 27 to the transfer medium 11.

While transferring the multicolor toner image to the transfer element 11, the transfer roller 28 comes into contact with the transfer element 11 at a position 28a and moves away to a position 28b after printing.

The fixing portion 30 melts and fixes the transferred multicolor toner image while carrying the transfer medium 11, and has a fixing roller 31 for heating the transfer medium 11 and a pressurizing roller 32 for bringing the transfer medium 11 into pressure-contact with the fixing roller 31 as shown in FIG. 1.

The fixing roller 31 and pressurizing roller 32 are formed to be hollow, having heaters 33 and 34 installed therein respectively.

To be more specific, the transfer medium 11 holding the multicolor toner image is carried by the fixing roller 31 and pressurizing roller 32, and also has heat and pressure applied thereto so that the toner is fixed on the surface.

After the toner image is fixed, the transfer medium 11 is discharged to a discharge paper tray (not shown) by a discharge roller (not shown) so as to finish the image forming operation.

Cleaning means 29 cleans toner remaining on the intermediate transfer member 27, where waste toner is stored in a cleaner container (not shown) after transferring the multicolor toner image of four colors formed on the intermediate transfer member 27 to the transfer medium 11.

Figure 7:
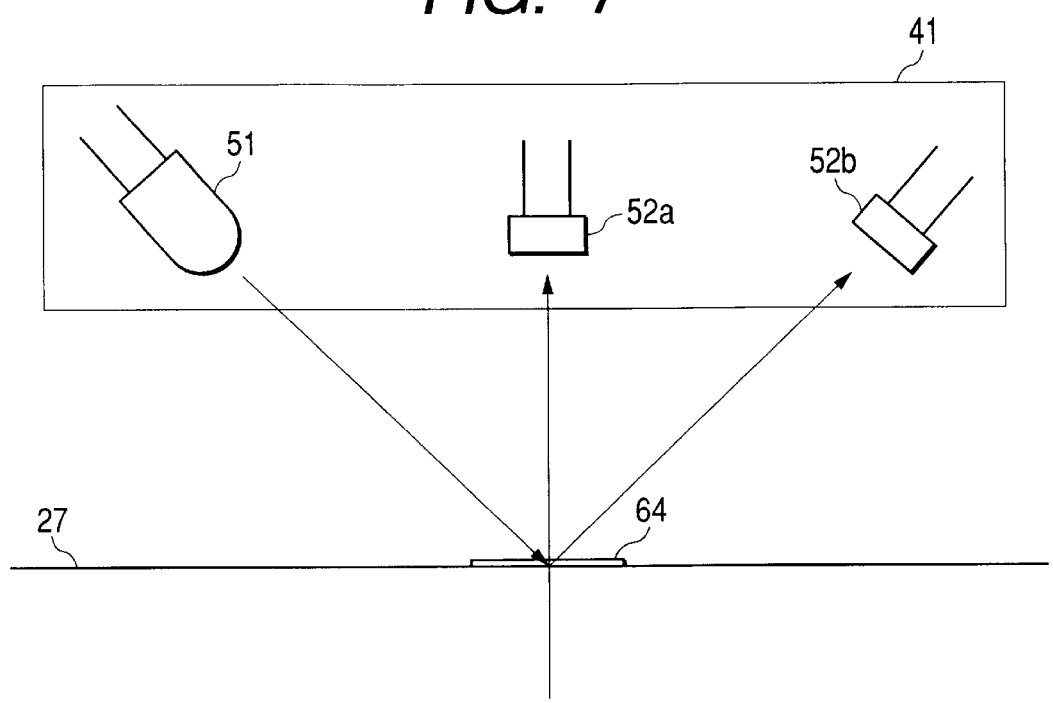
FIG. 7 is a diagram showing a configuration of a density sensor.

In the color image forming apparatus shown in FIG. 1, a density sensor 41 is placed toward the intermediate transfer member 27, and measures density of a toner patch formed on the surface of the intermediate transfer member 27. FIG. 7 shows an example of the configuration of the density sensor 41. It is comprised of an infrared light emitting device 51 such as an LED, a light receiving element 52 such as a photodiode or Cds, an IC (not shown) for processing light receiving data, and a holder (not shown) for holding them. A light receiving element 52a detects irregular reflection light intensity from the toner patch, and a light receiving element 52b detects regular reflection light intensity therefrom. It is possible to detect the density of the toner patch ranging from high to low density by detecting both the regular reflection light intensity and irregular reflection light intensity. Moreover, there are the cases where an optical element (not shown) such as a lens or the like is used to combine the above described light emitting device 51 and light receiving element 52.

Figure 8:
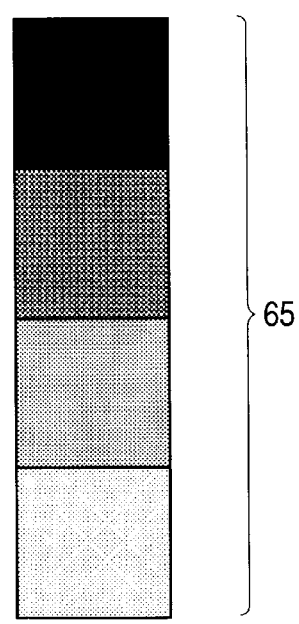
FIG. 8 is a diagram showing a patch pattern for controlling the density-gradation characteristics, formed on the intermediate transfer member.

FIG. 8 shows an example of a patch pattern for controlling the density-gradation characteristics to be formed on the intermediate transfer member. Gradation patches 65 of unfixed K toner monochrome are aligned. Thereafter, gradation patches of C, M or Y toner monochrome (not shown) are continuously formed. The above described density sensor 41 cannot distinguish the color of the toner placed on the intermediate transfer member. For that reason, the gradation patch 65 of the monochromatic toner is formed on the intermediate transfer member. Thereafter, this density data is fed back to a calibration table for correcting the density-gradation characteristics of the image processing portion and each process condition of the image forming portion.

In addition, the density sensor 41 includes one in which, using a conversion table for performing conversion from detected density into a color difference from a specific type of paper, output is effected after the conversion into the color difference from the specific type of paper, which is however limited to monochrome patches of C, M, Y and K. In the case where the density sensor is capable of outputting the color difference from the specific type of paper in addition to the density, it is also possible to control the color difference-gradation characteristics from the specific type of paper of each of C, M, Y and K instead of controlling the density-gradation characteristics of each of C, M, Y and K. In this case, the density of the density-gradation characteristic control described so far should be totally changed to the color difference from the specific paper type. It is possible to obtain the gradation characteristics more suited to human visual characteristics by controlling the color difference-gradation characteristics from the specific type of paper of each of C, M, Y and K.

A color sensor 42 is placed toward the image forming surface of the transfer medium 11 on the downstream side of the fixing portion 30 of a transfer medium carriage route in the color image forming apparatus shown in FIG. 1, and detects an RGB output value of the color of a fixed mixed-color patch formed on the transfer medium 11. It is possible, by placing it inside the color image forming apparatus, to automatically detect the fixed image before discharge to a paper discharge portion.

Figure 9:
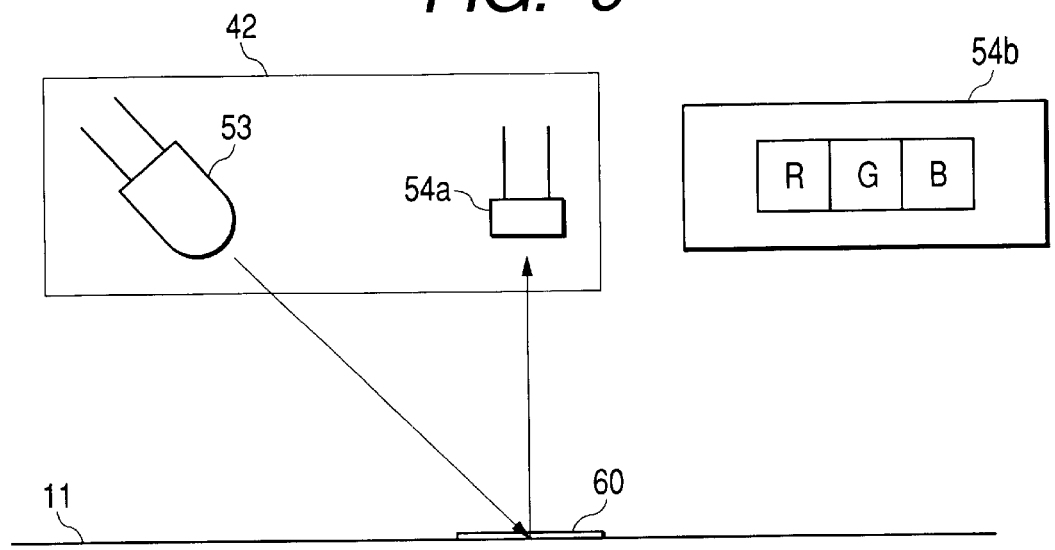
FIG. 9 is a diagram showing a configuration of a color sensor.

FIG. 9 shows an example of the configuration of the color sensor 42. The color sensor 42 is comprised of a white LED 53 and a charge-accumulative sensor 54 with an RGB on-chip filter. Light is irradiated form the white LED 53 to the transfer medium 11 having the fixed patch formed thereon at an incident angle of 45 degrees, and the irregular reflection light intensity toward a 0-degree direction is detected by the charge-accumulative sensor 54a with the RGB on-chip filter. The photoreceptive portion of the charge-accumulative sensor 54a with the RGB on-chip filter has RGB as independent pixels as in 54b. The charge-accumulative sensor of the charge-accumulative sensor 54 with the RGB on-chip filter may be a photodiode. It may also be several sets of the three pixels of RGB aligned. In addition, it may also have the configuration wherein an incident angle is 0 degree and a reflection angle is 45 degrees. Furthermore, it may also be comprised of an LED emitting light of three colors of RGB and a no-filter sensor.

Figure 10:
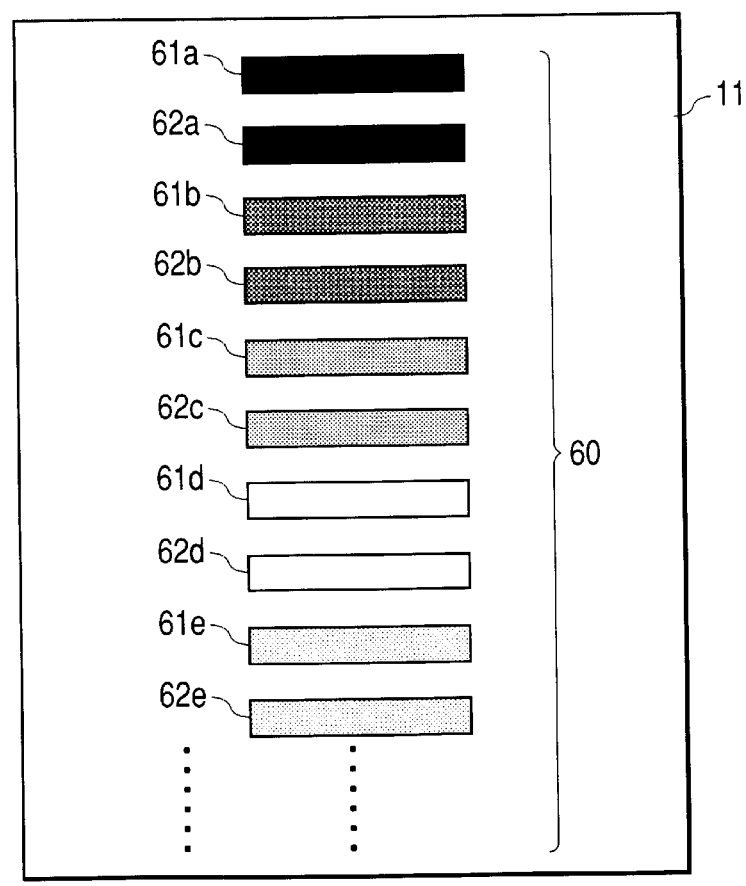
FIG. 10 is a diagram showing a patch pattern for controlling the density-gradation characteristics, formed on the transfer element.

Here, FIG. 10 shows an example of the fixed patch pattern for controlling the density-gradation characteristics to be formed on the transfer medium 11. The patch pattern for controlling the density-gradation characteristics is the center of a color reproduction area, and is a gradation patch pattern of gray which is a very important color in achieving the color balance. It is comprised of a gray gradation patch 61 of black (K) and a process gray gradation patch 62 of the mixed colors of cyan (C), magenta (M), and yellow (Y), where the gray gradation patch 61 of K and the CMY process gray gradation patch 62 which are close in chromaticity are aligned in pairs on a standard color image forming apparatus such as 61a and 62a, 61b and 62b, and 61c and 62c. An RGB output value of this patch is detected by the color sensor 42.

The fixed patch pattern for controlling the density-gradation characteristics, formed on the transfer medium 11, is not limited to a gray patch pattern but may also be a monochrome gradation patch pattern of C, M, Y or K. To be more specific, it may also be a fixed one of the earlier explained patch pattern for controlling the density-gradation characteristics to be formed on the intermediate transfer member. In addition, it is also possible to calculate the absolute chromaticity by providing an absolute white criterion and so on.

Furthermore, as the RGB output value successively changes relatively to the gradation, it is possible, by mathematically processing the RGB output values of a certain gradation and the gradation adjacent thereto by means of primary or secondary approximation, to calculate an estimate of the RGB output value between the detected gradations. Even in the case where there is no absolute white criterion and the absolute chromaticity cannot be calculated, it is possible, by making a relative comparison of the RGB output values between the gray gradation patch of K and the CMY process gray gradation patch, to calculate a mixture ratio of the three colors of CMY of the process gray patch of the mixed three colors of CMY of which chromaticity is almost the same as that of the gray patch of K of a certain gradient.

Figure 2:
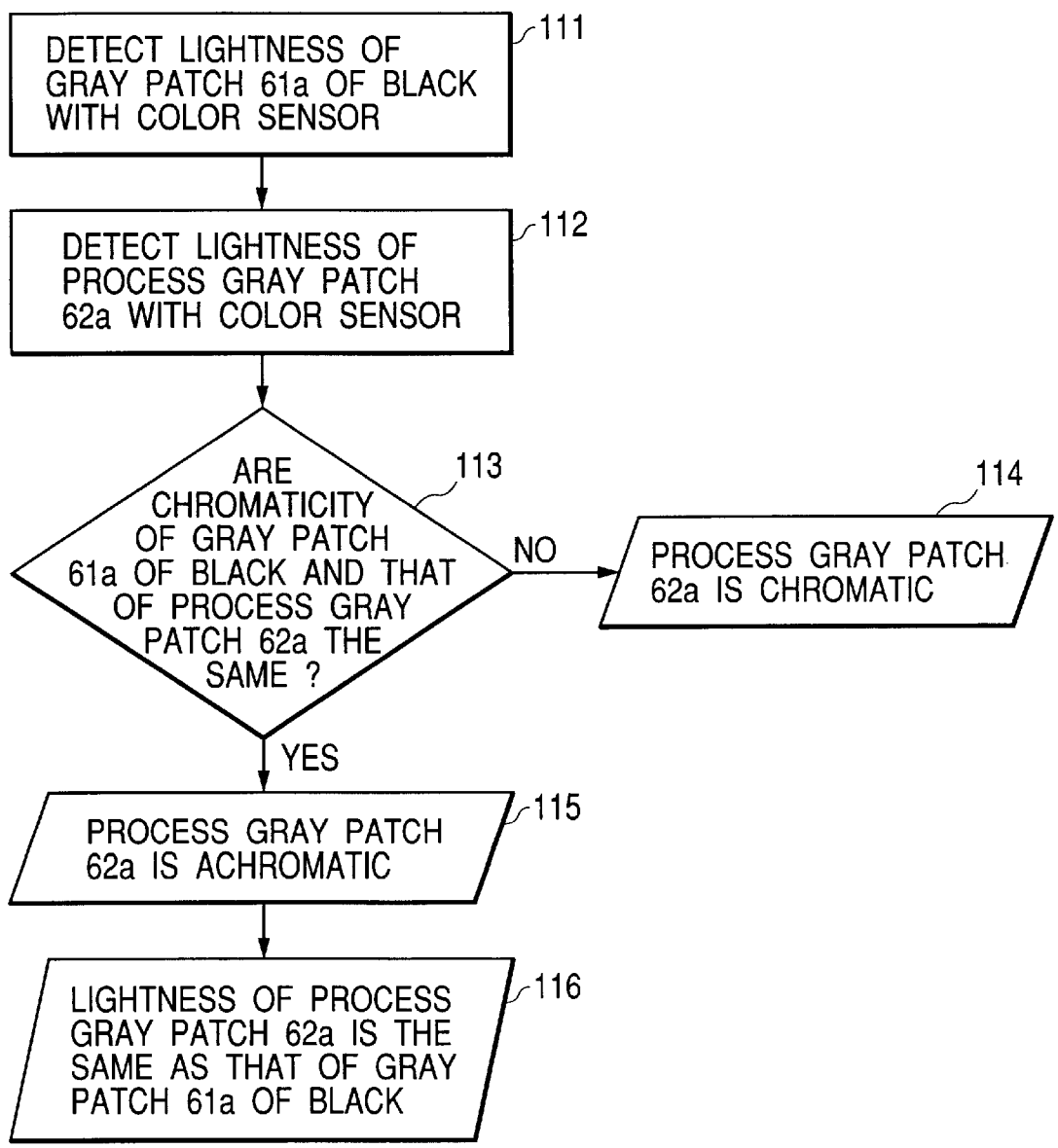
FIG. 2 is a flowchart showing the first embodiment of a color identification method of the image forming apparatus of the present invention.

FIG. 2 is a flowchart showing a color identification method in this embodiment for determining that the process gray patch is an achromatic color without using the criterion for the sensor output proofreading, and if it is the achromatic color, detecting which of gradation of black it is equivalent to in lightness.

This embodiment will be described on the basis of FIGS. 1, 2 and 8.

The transfer medium 11 having a density or chromaticity controlling patch pattern 60 formed thereon passes through the fixing portion 30, and detects the chromaticity of a gray patch 61a of black with the color sensor 42 in a step 111.

Furthermore, it detects the chromaticity of a process gray patch 62a in a step 112.

As the criterion for the sensor output proofreading is not used for the chromaticity detected in the steps 111 and 112, absolute accuracy of the chromaticity does not matter.

In a step 113, using the fact that the gray patch 61 of black is almost the achromatic color, relative comparison is made on whether the chromaticity of the gray patch 61a of black and that of the process gray patch 62a are the same.

In the case where the chromaticity is different between them, it is determined that the process gray patch 62a is a chromatic color in a step 114.

In the case where the chromaticity is the same between them, it is determined that the process gray patch 62a is the achromatic color in a step 115.

Furthermore, in a step 116, it is detected that the lightness of a process gray patch 62a is the same as that of the gray patch 61a of black.

However, an absolute value of the lightness referred to in this case does not indicate the lightness of the chromaticity detected in the steps 112.

As the chromaticity in the steps 112 cannot have the absolute accuracy calculated, what is known here is that the absolute value of the lightness is the same.

This series of processing is sequentially performed for all the patches 61a, 61b, 61c . . . , 62a, 62b, 62c . . . of the density or chromaticity controlling patch pattern 60 formed on the transfer medium 11.

It is also possible to detect the chromaticity of all the patches 61 and 62 first and then collectively determine whether or not the process gray is the achromatic color.

In addition, it is also possible to extend the subjects of the relative comparison with the chromaticity of the process gray patch 62 in the step 113 to the chromaticity of all the gray patches 61 of black that were measured.

In addition, when making the relative comparison between the chromaticity of the gray patch 61 of black and that of the process gray patch 62, even if they are not completely consistent with each other, it is also possible to determine that the patch to be detected is an achromatic color as far as the color difference is within a range acceptable to human beings such as within ΔE3.

It is possible, by the above color identification method of the color image forming apparatus, to determine whether or not the process gray patch is the achromatic color and know a level of the lightness thereof without using the criterion of the sensor output proofreading of the color sensor, and so it is less expensive because the above described criterion is not necessary. Moreover, the relative comparison is made between the gray patch of black and the process gray patch instead of detecting the absolute chromaticity, so that it is possible to output sufficient data for performing highly accurate density or chromaticity control without being influenced by contamination of the sensor caused by scattered paper powder, toner or ink, without being influenced by a temperature characteristics of the sensor and without being influenced by variations in spectral characteristics of the sensor.

Furthermore, the mixture ratio of the three colors of yellow, magenta and cyan at which the process gray patch becomes an achromatic color is calculated for a plurality of gradations by mixture ratio calculation means from the data obtained by the color identification method of the above described image forming apparatus.

This mixture ratio is fed back to the image processing portion of the image forming apparatus to control image forming conditions so that the image forming apparatus of good density-gradation characteristics can be provided.

Figure 3:
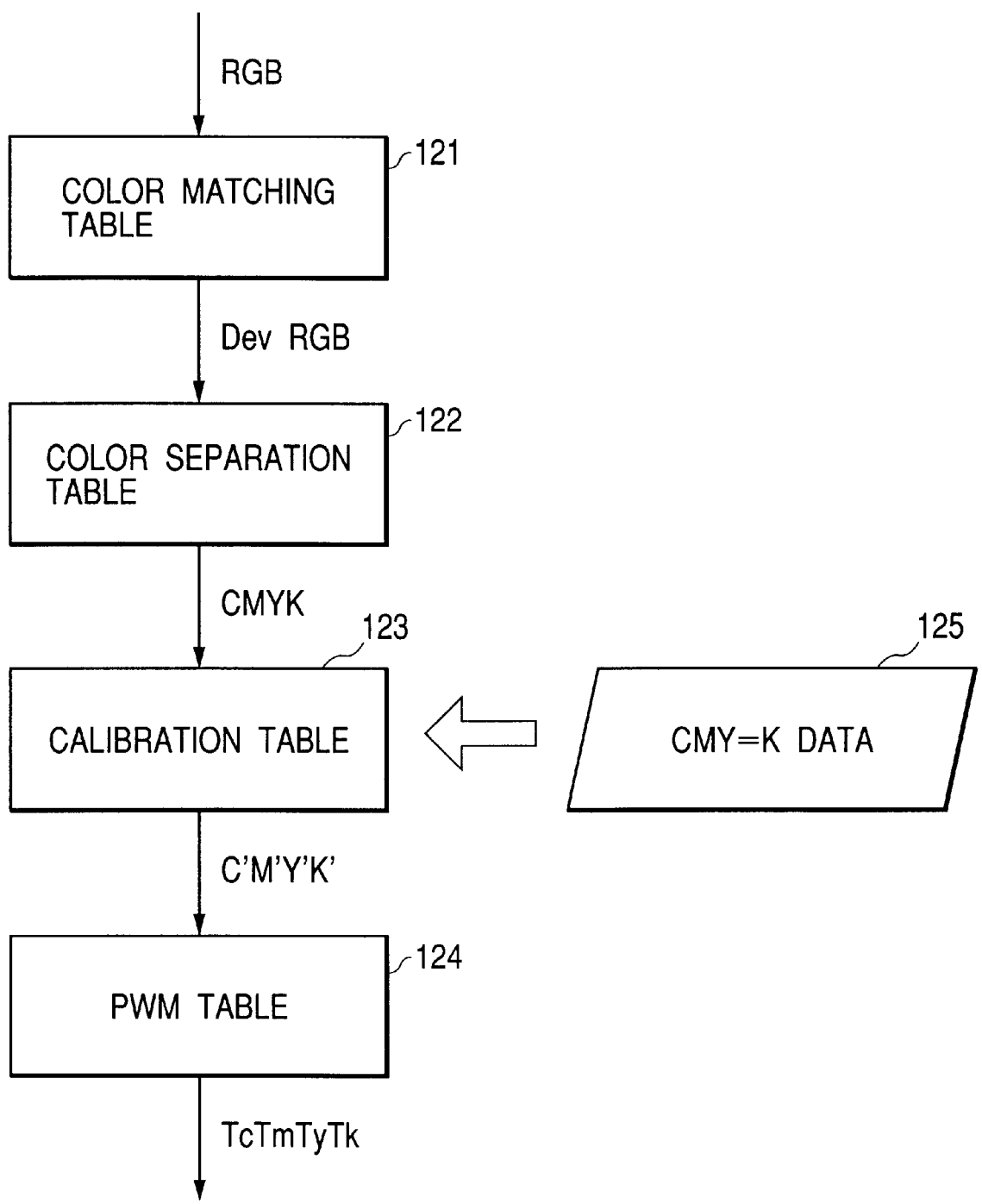
FIG. 3 is a flowchart showing an example of a process in the image processing portion of the image forming apparatus of the present invention.

FIG. 3 is a flowchart showing an example of a process in the image processing portion of the image forming apparatus.

In a step 121, an RGB signal representing a color of an image sent from a personal computer and so on is converted into a device RGB signal (hereafter, referred to as DevRGB) conformed to the color reproduction area of the image forming apparatus by a color matching table prepared in advance.

In a step 122, the above described DevRGB signal is converted into a CMYK signal which is a toner color material color of the image forming apparatus by a color separation table prepared in advance.

In a step 123, the above described CMYK signal is converted into a C'M'Y'K' signal of which density-gradation characteristics are corrected by calibration table for correcting the density-gradation characteristics unique to each image forming apparatus.

In a step 124, it is converted into exposure times Tc, Tm, Ty and Tk of the above described scanner portions 24C, 24M, 24Y and 24K corresponding to the above described C'M'Y'K' signal according to a PWM (Pulse Width Modulation) table.

In a step 125, the mixture ratio of the above described three colors of yellow, magenta and cyan at which the process gray patch becomes an achromatic color is fed back to the above described calibration table in the step 123 so that the density-gradation characteristics unique to each image forming apparatus can be corrected.

As described earlier, the density-gradation characteristics change according to environmental change and long-time use, and so it is very effective to perform the above correction in predetermined timing.

Besides, it is also possible to correct the color matching table and the color separation table.

Second Embodiment

Figure 4:
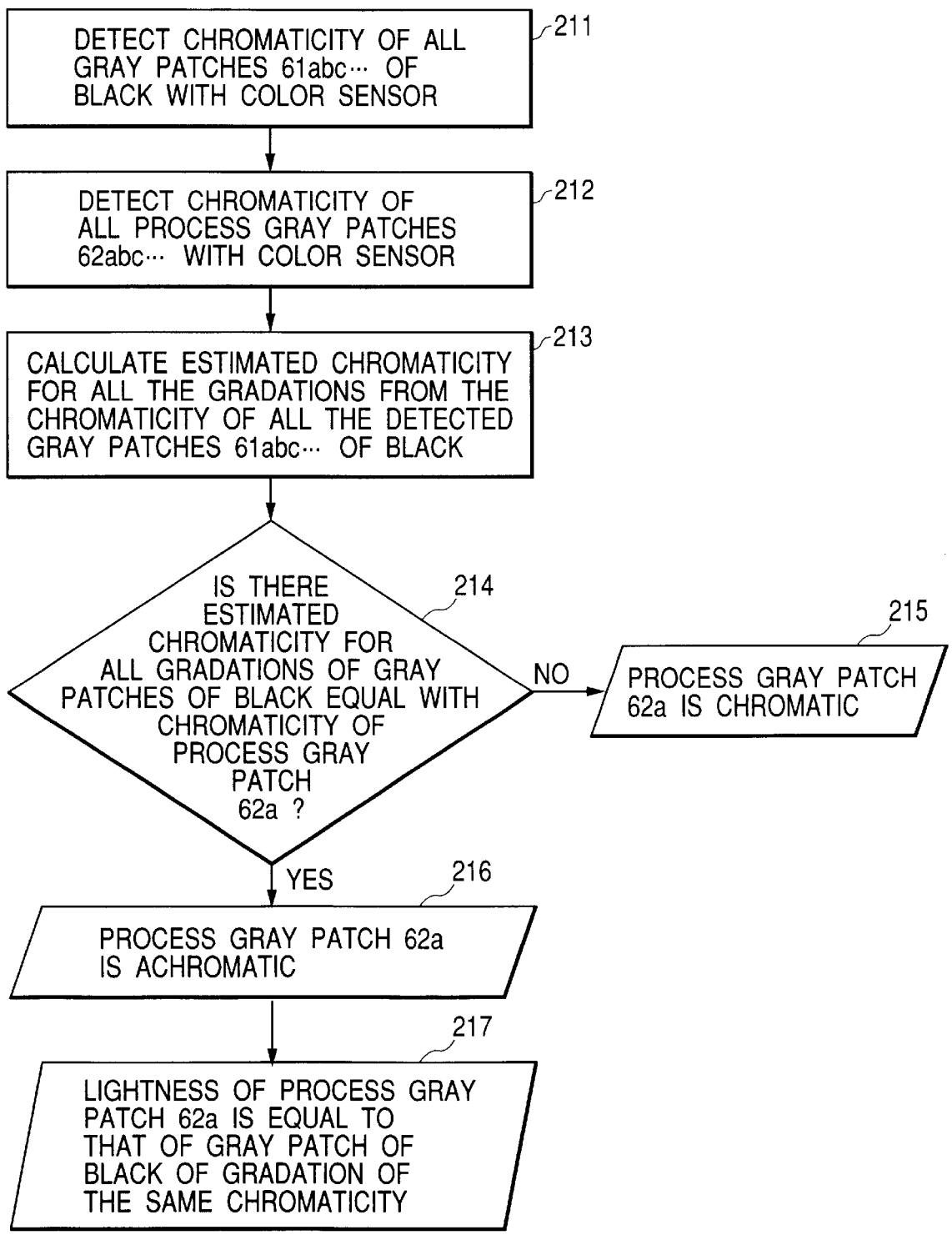
FIG. 4 is a flowchart showing a second embodiment of the color identification method of the image forming apparatus of the present invention.

FIG. 4 is a flowchart showing the color identification method for determining that the process gray patch is an achromatic color without using a criterion for the sensor output proofreading in this embodiment and if it is the achromatic color, detecting which gradation of black it is equivalent to in lightness.

The second embodiment is different from the first embodiment in that estimated chromaticity of the gray patches of black of all the gradations is calculated from the chromaticity of a plurality of gray patches of black of different gradients, and the relative comparison is made between the chromaticity of the process gray patch and this estimated chromaticity.

This embodiment will be described on the basis of FIGS. 1, 4 and 8. The transfer medium 11 having formed the density or chromaticity controlling patch pattern 60 formed thereon passes through the fixing portion 30, detecting the chromaticity of all the gray patches 61a, 61b, 61c . . . of black with the color sensor 42 in a step 211.

Furthermore, it detects the chromaticity of all the process gray patches 62a, 62b, 62c . . . in a step 212.

As the criterion for the sensor output proofreading is not used for the chromaticity detected in the steps 211 and 212, the absolute accuracy of the chromaticity does not matter.

After detecting the chromaticity of all the patches 61 and 62, the estimated chromaticity for all the gradients is calculated from the chromaticity of all the gray patches 61a, 61b, 61c . . . of black in a step 213.

As the chromaticity successively changes relatively to the gradation, it is calculated by using the chromaticity of the adjacent gradients of the detected gradients and performing the mathematical process such as the primary or secondary approximation.

In a step 214, a search and the relative comparison are performed, by using the fact that the gray patches 61 of black are mostly the achromatic colors, as to whether or not the chromaticity detected from the process gray patch 62a is the same as the chromaticity of any gradation of the estimated chromaticity of the gray patches of black calculated in the step 213.

As a result of the relative comparison, in the case where there is no matching chromaticity, the process gray patch 62a is determined to be the chromatic color in a step 215.

In the case where there is matching chromaticity, the process gray patch 62a is determined to be the achromatic color in a step 216.

Furthermore, it is detected that the lightness of the chromaticity of the process gray patch 62a is the same as that of the gray patch of black of the matching chromaticity in a step 217.

However, the absolute value of the lightness referred to here is not the lightness of the estimated chromaticity calculated in the step 213.

As the estimated chromaticity of the step 213 cannot have the absolute accuracy calculated, it is known here that the absolute value of the lightness is the same.

The processing from the step 214 onward is sequentially performed for all the process gray patches 62a, 62b, 62c . . . of the density or chromaticity controlling patch pattern 60 formed on the transfer medium 11.

In addition, when making the relative comparison between the chromaticity of the gray patch 61 of black and that of the process gray patch 62, even if they are not completely consistent with each other, it is also possible to determine that the patch to be detected is an achromatic color as far as the color difference is within a range acceptable to human beings such as within ΔE3.

According to the color identification method of the color image forming apparatus of this embodiment, it is possible, in addition to the effects of the first embodiment, to output sufficient data for performing highly accurate density or chromaticity control by calculating the estimated chromaticity for all the gradients even if the color balance is significantly collapsed.

Furthermore, as described in the first embodiment, the mixture ratio of the three colors of yellow, magenta and cyan at which the process gray patch becomes the achromatic color is calculated for a plurality of gradations from the data obtained by the color identification method of the above described image forming apparatus.

This mixture ratio is fed back to the image processing portion of the image forming apparatus to control the image forming conditions so that the image forming apparatus of good density-gradation characteristics can be provided.

Third Embodiment

Figure 5:
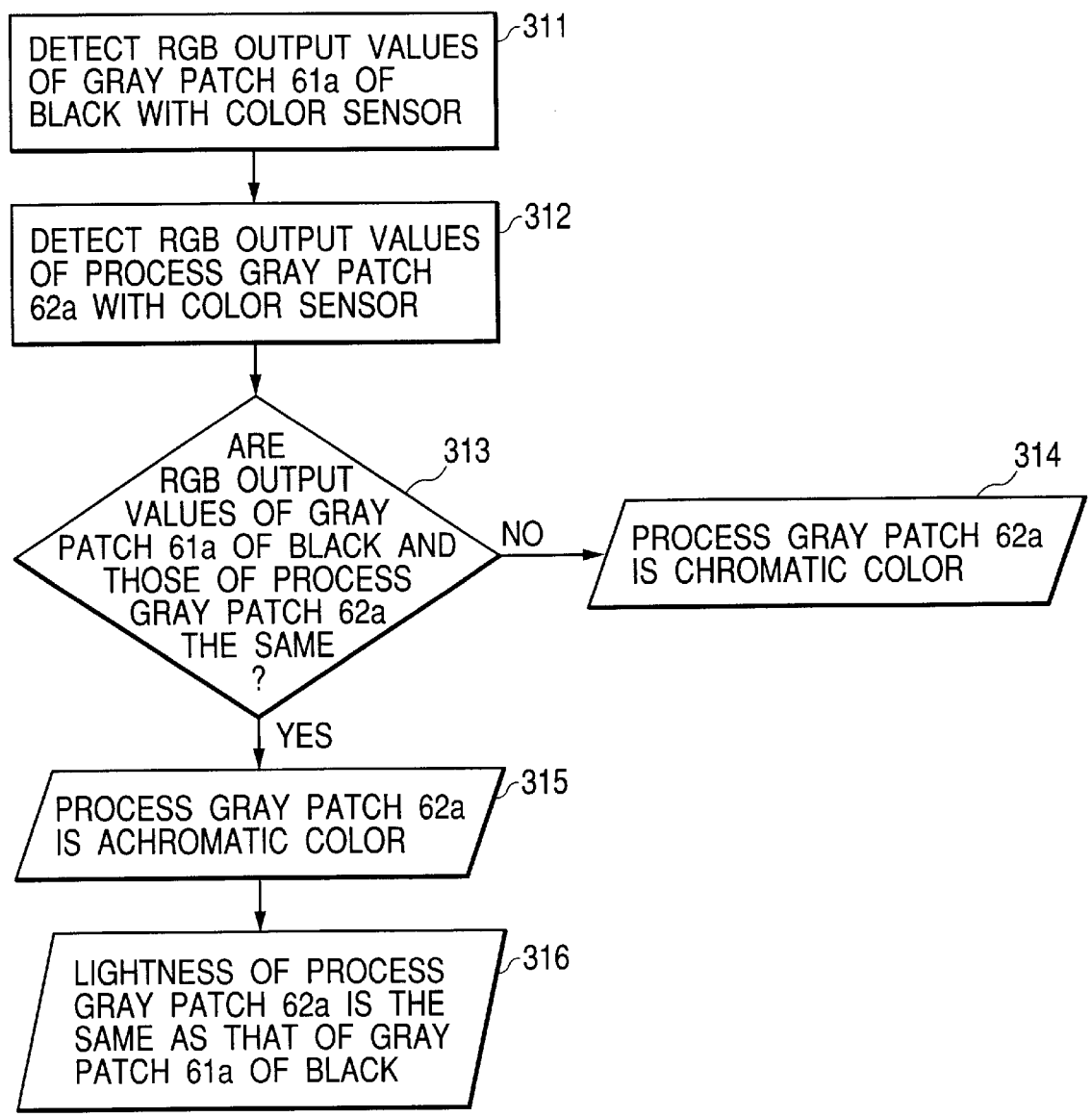
FIG. 5 is a flowchart showing a third embodiment of the color identification method of the image forming apparatus of the present invention.

FIG. 5 is a flowchart showing the color identification method for determining that the process gray patch is an achromatic color without using a criterion for the sensor output proofreading in this embodiment, and if it is an achromatic color, detecting of which gradient of black it is equivalent to in lightness.

The third embodiment is different from the first embodiment in that, when making the relative comparison between the process gray patch and the gray patch of black, the relative comparison is made among three different outputs of the color sensor 42 before conversion into the chromaticity such as the RGB output values (output signals) instead of the chromaticity.

This embodiment will be described on the basis of FIGS. 1, 5 and 8.

The transfer medium 11 having the density or chromaticity controlling patch pattern 60 formed thereon passes through the fixing portion 30, detecting the RGB output values of the gray patch 61*a* of black with the color sensor 42 in a step 311.

Furthermore, the RGB output values of the process gray patch 62*a* in a step 312 are detected.

In a step 313, using the fact that the gray patch 61 of black is almost the achromatic color, relative comparison is made on whether or not the RGB output values of the gray patch 61*a* of black and those of the process gray patch 62*a* are the same.

In the case where even one of the RGB output value is different between them, it is determined that the process gray patch 62*a* is a chromatic color in a step 314.

In the case where all the three RGB output values are the same between them, it is determined that the process gray patch 62*a* is an achromatic color in a step 315.

Furthermore, in a step 316, it is detected that the lightness of the process gray patch 62*a* is the same as that of the gray patch 61*a* of black.

In addition, it is also possible, instead of making the relative comparison of the RGB output values, to make the relative comparison between the ratios of the RGB output values of the gray patches 61 and 62 and the RGB output values for detecting a no-patch portion of the transfer medium 11.

This series of processing is sequentially performed for all the patches 61*a*, 61*b*, 61*c* . . . , 62*a*, 62*b*, 62*c* . . . of the density or chromaticity controlling patch pattern 60 formed on the transfer medium 11.

It is also possible to detect the RGB output values of all the patches first and then collectively determine whether or not the process gray patch 62 is an achromatic color.

In addition, it is also possible in the step 313 to extend the subjects of the relative comparison with the RGB output values of the process gray patch 62 to the RGB output values of all the gray patches 61 of black that were measured.

In addition, when making the relative comparison between the RGB output values of the gray patch 61 of black and those of the process gray patch 62, even if they are not completely consistent with each other, it may be determined that the patch to be detected is an achromatic color as far as the color difference is within a range of an output difference or an output ratio difference set to be equivalent to a color difference acceptable to human beings.

According to the color identification method of the color image forming apparatus of this embodiment, it is possible, in addition to the effects of the first embodiment, to output sufficient data for easily performing highly accurate density or chromaticity control by using the output values of the color sensor without converting them.

Furthermore, as described in the first embodiment, the mixture ratio of the three colors of yellow, magenta and cyan at which the process gray patch becomes an achromatic color is calculated as to a plurality of gradations from the data obtained by the color identification method of the above described image forming apparatus.

This mixture ratio is fed back to the image processing portion of the image forming apparatus to control the image forming conditions so that the image forming apparatus of good density-gradation characteristics can be provided.

Fourth Embodiment

Figure 6:
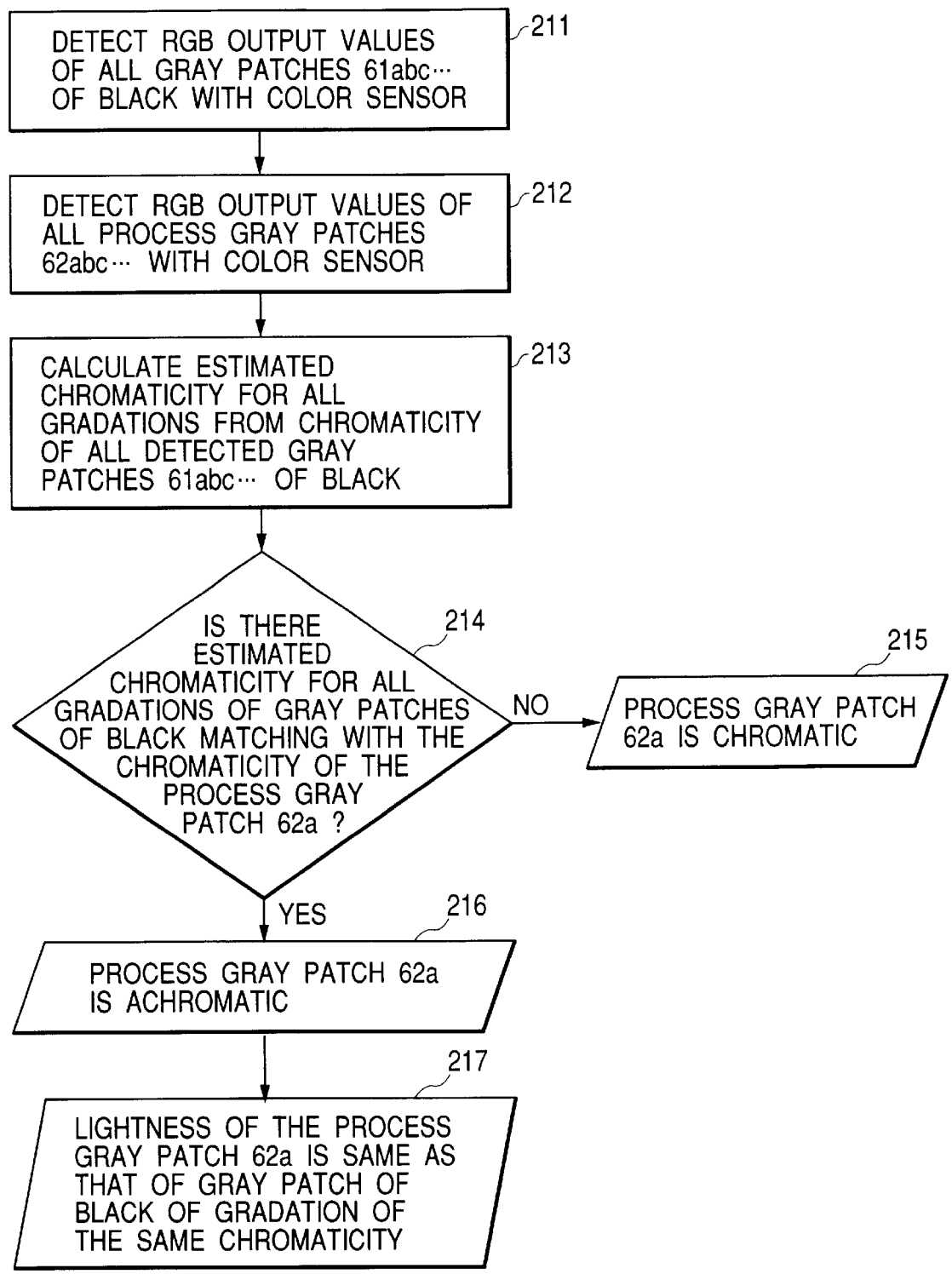
FIG. 6 is a flowchart showing a fourth embodiment of the color identification method of the image forming apparatus of the present invention.

FIG. 6 is a flowchart showing the color identification method for determining that the process gray patch is an achromatic color without using a criterion for the sensor output proofreading in this embodiment and if it is the achromatic color, detecting which gradation of black it is equivalent to in lightness.

The fourth embodiment is different from the second embodiment in that, the relative comparison between the process gray patch and the gray patch of black is made among three different outputs of the color sensor 42 before conversion into the chromaticity such as the RGB output values (output signals) instead of the chromaticity.

This embodiment will be described on the basis of FIGS. 1, 6 and 8.

The transfer medium 11 having a density or chromaticity controlling patch pattern 60 formed thereon passes through the fixing portion 30, detecting the RGB output values of all the gray patches 61*a*, 61*b*, 61*c* . . . of black with the color sensor 42 in a step 411.

Furthermore, the RGB output values of all the process gray patches 62*a*, 62*b*, 62*c* . . . in a step 412 are detected.

After detecting the RGB output values of all the patches 61 and 62, the estimated RGB output values for all the gradations are calculated from the RGB output values of all the gray patches 61 of black detected in a step 413.

As the RGB output values successively change relatively to the gradations, they are calculated by using the RGB output values of the adjacent gradations of the measured gradations and performing the mathematical process such as the primary or secondary approximation.

In a step 414, the search and relative comparison are performed, by using the fact that the gray patches of black are mostly achromatic colors, as to whether or not the RGB output values detected from the process gray patch 62*a* are the same as any gradation of the estimated RGB output values of the gray patches of black calculated in the step 413.

As a result of the relative comparison, in the case where there is no matching RGB output value, the process gray patch 61*a* is determined to be a chromatic color in a step 415.

In the case where there are matching RGB output values, the process gray patch 61*a* is determined to be an achromatic color in a step 416.

Furthermore, it is detected that the lightness of the process gray patch 61*a* is the same as that of the gray patch of black of a certain gradation of the matching RGB output values in a step 417.

The processing from the step 414 onward is sequentially performed to all the process gray patches 62*a*, 62*b*, 62*c* . . . of the density or chromaticity controlling patch pattern 60 formed on the transfer medium 11.

It is also possible, instead of making the relative comparison of the RGB output values, to make the relative comparison between the ratios of the RGB output values of the gray patches 61 and 62 and the RGB output values for detecting the no-patch portion of the transfer medium 11.

In addition, when making the relative comparison between the RGB output values of the gray patch 61 of black and those of the process gray patch 62, even if they are not completely consistent with each other, it may be determined that the patch to be detected is an achromatic color as far as the color difference is within a range of an output difference or an output ratio difference set to be equivalent to the color difference acceptable to human beings.

According to the color identification method of the color image forming apparatus of this embodiment, it is possible, in addition to the effects of the second embodiment, to output the sufficient data for easily performing highly accurate density or chromaticity control by using the output values of the color sensor without converting them.

Furthermore, as described in the first embodiment, the mixture ratio of the three colors of yellow, magenta and cyan at which the process gray patch becomes the achromatic color is calculated as to a plurality of gradations from the data obtained by the color identification method of the above described image forming apparatus.

This mixture ratio is fed back to the image processing portion of the image forming apparatus to control the image forming conditions so that the image forming apparatus of good density-gradation characteristics can be provided.

It is possible, by the above color identification method of the color image forming apparatus, to determine whether or not the process gray patch is an achromatic color and know the level of the lightness thereof without using the criterion of the sensor output proofreading of the color sensor, and so it is less expensive because the above described criterion is not necessary. Moreover, it is possible to output sufficient data for performing highly accurate density or chromaticity control without being influenced by contamination of the sensor caused by scattered paper powder, toner or ink, without being influenced by the temperature characteristics of the sensor and without being influenced by variations in the spectral characteristics of the sensor.

Furthermore, the mixture ratio of the three colors at which the process gray patch becomes the achromatic color is calculated from this data, and it is fed back to the image processing portion of the image forming apparatus to control the image forming conditions so that the image forming apparatus of good density-gradation characteristics can be provided.

In addition, it is possible to output sufficient data for performing highly accurate density or chromaticity control by calculating the estimated chromaticity for all the gradations even if the color balance is significantly collapsed.

In addition, it is possible to output sufficient data for easily performing highly accurate density or chromaticity control by using the output values of the color sensor without converting them.

Fifth Embodiment

Figure 11:
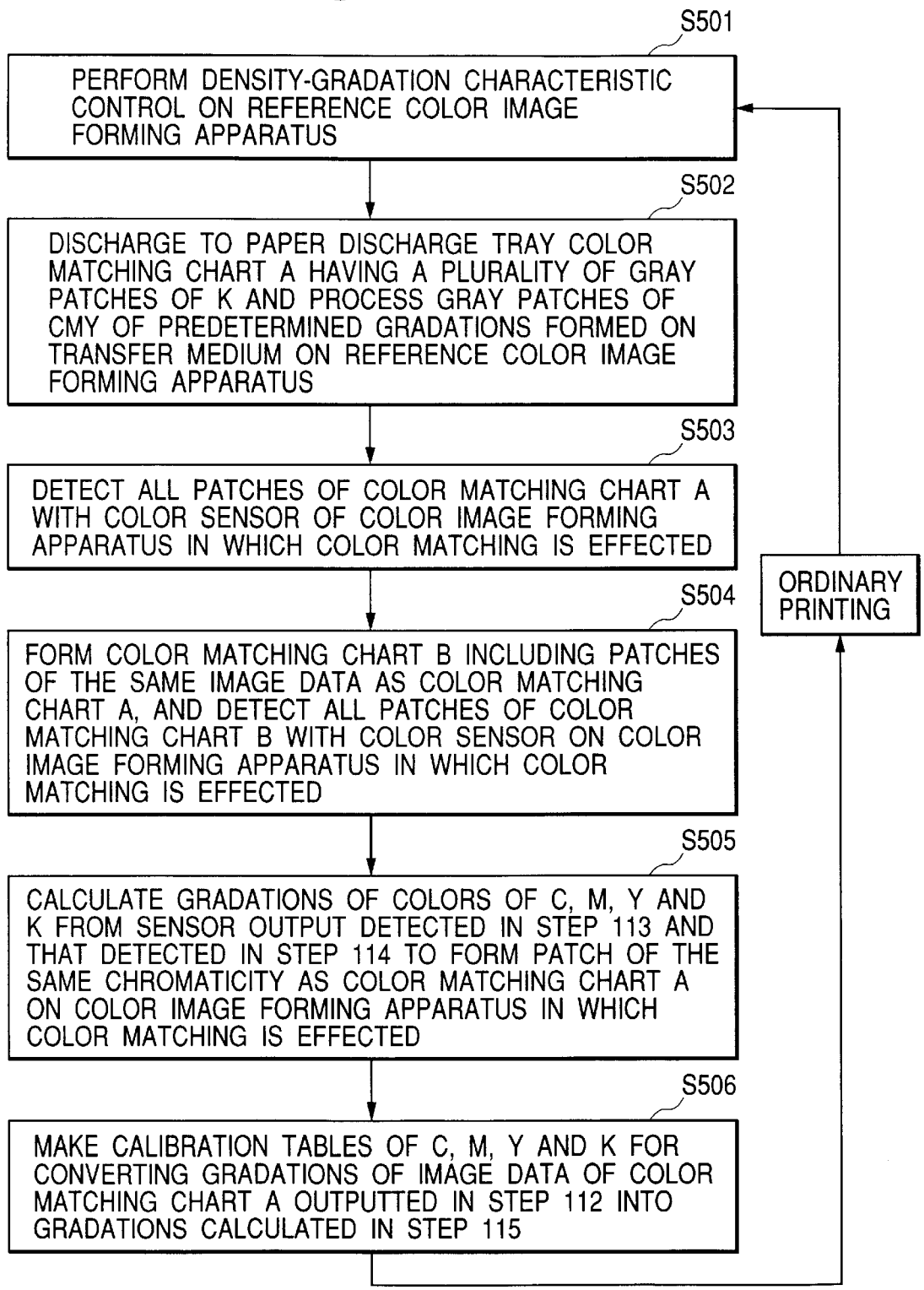
FIG. 11 is a flowchart showing control in a fifth embodiment.

FIG. 11 is a flowchart showing control for improving color reproducibility among a plurality of color image forming apparatuses having the color sensor mounted thereon. This control is effected during intervals of ordinary printing operation. It is carried out by a user according to instructions in predetermined timing after detecting the environmental change, the number of sheets to be printed and so on or by user's manual operation when a user desires to do it.

In a step 501, the density-gradation characteristic control is performed on the reference color image forming apparatus for color matching, and each of calibration tables 223 of C, M, Y and K is so renewed as to return the density-gradation characteristics of the reference color image forming apparatus to a target. Details of the tables 223 will be described later. This renewal can be performed by using a density sensor/color sensor installed inside the color image forming apparatus or by using a color meter, a densitometer and an image reader which are commercially available outside the color image forming apparatus.

Moreover, the density-gradation characteristic control performed in this step may also be the color difference from the specific paper type-gradation characteristic control.

In a step 502, there is discharged to the paper discharge portion a color matching chart A having a plurality of gray patches of K and process gray patches of CMY of predetermined gradation formed on the transfer medium on the reference color image forming apparatus. The color matching chart A is similar to the example of the fixed density-gradation characteristic controlling patch pattern shown in FIG. 10 described above.

In a step 503, the color matching chart A is conveyed to the color sensor of the color image forming apparatus, and all the patches of the color matching chart A are detected with the color sensor. The conveyance of the color matching chart A is carried out by a user from the paper discharge portion of the reference color image forming apparatus to the sheet feeding portion of the color image forming apparatus, and by the color image forming apparatus from the sheet feeding portion to the color sensor.

In a step 504, a color chart B is formed on the transfer medium in the color image forming apparatus, the color matching chart B being comprised of patches of the same image data as the color matching chart A and patches whose gradations are extended to the range adjacent to the gradations of the aforementioned patches as to C, M, Y and K respectively, and all the patches of the color matching chart B are detected with the color sensor of the color image forming apparatus. For instance, in the color image forming apparatus having 255 gradations, with the color matching chart A, the gradations of the patches of image data are C100/255 (indicating that the gradient of cyan is 100, and so on), M100/255 and Y100/255, whereas with the color matching chart B, 9 patches in total are formed consisting of the patch of the color matching chart A and 8 patches in which the gradations of the CMY colors of the process gray patches are extended adjacently by 15 gradations as shown in the table in FIG. 12A. In addition, in the case of the patch of K monochrome and the gradation of 100/255, the color matching chart B is comprised of 3 patches in total by adding 2 patches in which only the gradations of K are extended as shown in the table in FIG. 12B.

In a step 505, calculation is conducted for the difference between the detection results of the color matching chart A detected by the color sensor of the color image forming apparatus in the step 503 and the detection results of the patch of the same image data as the color matching chart A in the color matching chart B detected in the step 504, and the gradations of the colors of C, M, Y and K are calculated in order to form the patch of the same chromaticity as the color matching chart A in the color image forming apparatus. They are calculated by using the fact that a color sensor output successively changes as the gradation changes and interpolating the sensor output among the gradations of the patches 1 to 8 in the table in FIG. 12A.

In a step 506, calibration tables 223 of C, M, Y and K are made for converting the gradations of C, M, Y and K of the image data of the patch of the color matching chart A into the gradients of C, M, Y and K for forming the patches of the same chromaticity as the color matching chart A calculated in the step 115. For instance, assuming that the gradations for forming in the color image forming apparatus the patches of the same chromaticity as the color matching chart A outputted in the reference color image forming apparatus are calculated to be C110/255, M100/255 and Y90/255 in the step 505, with respect to the patches in which the gradations of the image data shown in step 115 are C100/255, M100/255 and Y100/255, the calibration tables 223 are made for converting C100/255 into C'110/255, M100/255 into M'100/255, and Y100/255 into Y'90/255 in the color image forming apparatus.

From the step 506 onward, ordinary printing is performed, and it returns to the step 111 when this control is carried out in the aforementioned timing again.

As this control corrects the density-gradation characteristics of the reference color image forming apparatus in the step 501, the color matching chart A itself is a target of the density-gradation characteristics of the reference color image forming apparatus. Therefore, it is possible, in the step 506, to make the calibration tables 223 of the color image forming apparatus on which the color is to be matched by using as-is the conditions for forming the patches of the same chromaticity as the color matching chart A in the color image forming apparatus.

As described above, according to this embodiment, the color matching chart outputted by using the reference color image forming apparatus having the density-gradation characteristics already controlled is detected by the color sensor of the color image forming apparatus in which the color matching is effected, thereby the calibration tables are so made as to improve the color reproducibility among a plurality of color image forming apparatuses.

Sixth Embodiment

FIG. 13 is a flowchart showing the control for improving the color reproducibility among the color image forming apparatuses having the color sensor mounted thereon in a "color image forming apparatus system" which is the sixth embodiment. The major differences from the first embodiment are that it does not initially require the density-gradation characteristic control in the reference color image forming apparatus, that just one sheet of the color matching chart is required to be ejected from the reference color image forming apparatus, and that the density-gradation characteristic control in the color image forming apparatus must use the color sensor installed inside the color image forming apparatus. This control is effected during intervals of ordinary printing operation. It is carried out by a user according to instructions in predetermined timing after detecting the environmental change, the number of sheets to be printed and so on or by user's manual operation when a user desires to do it.

In a step 601, the color matching chart is discharged to the paper discharge portion, which has a plurality of gray patches of K and process gray patches of CMY of the predetermined gradation formed on the transfer medium by using the reference color image forming apparatus for color matching. On this occasion, all the patches are detected with the color sensor of the reference color image forming apparatus.

In a step 602, the color matching chart is conveyed to the color sensor of the color image forming apparatus in which color matching is effected, and all the patches of the color matching chart are detected with the color sensor. The conveyance of the color matching chart is performed by a user from the paper discharge portion of the reference color image forming apparatus to the sheet feeding portion of the color image forming apparatus, and by the color image forming apparatus from the sheet feeding portion to the color sensor.

In a step 603, the reference color image forming apparatus in the step 601 notifies the color image forming apparatus of detection results of the color matching chart. As for the notifying means, the color image forming apparatus may have communication means for enabling communication between the color image forming apparatuses, or indirect communication means via an external apparatus such as a personal computer may be used.

In a step 604, a color sensor output correction table is made for converting color sensor detection results of the color image forming apparatus in the step 122 into color sensor output results of the reference color image forming apparatus notified in the step 123.

In a step 605, in the color image forming apparatus, the color sensor and the color sensor output correction table made in the step 124 are used to form the above described fixed density-gradation characteristic controlling patch pattern 63 on the transfer medium so as to control the density-gradation characteristics. On this occasion, the output value of the color sensor of the color image forming apparatus is converted into the color sensor output of the reference color image forming apparatus in the color sensor output correction table, and the converted output value is used to control the density-gradation characteristics of the color image forming apparatus. The density-gradation characteristic control performed in this step may also be the color difference gradation characteristic control from the specific type of paper. From the step 605 onward, the ordinary printing is performed, and it returns to the step 121 when this control is carried out in the aforementioned timing again.

This control is so constituted as to compare the color sensor output of the color image forming apparatus with that of the reference color image forming apparatus so that the variations of both the color sensors are corrected. Therefore, it is not necessary to initially perform the density-gradation characteristic control in the reference color image forming apparatus. In addition, the color matching chart is not limited to the described gray patch, but it may also be a chart of the chromatic color patch of primary to quartic colors. However, color reproducibility cannot be obtained unless the fixed density-gradation characteristic controlling patch pattern 63 formed on the transfer medium and the color sensor are used for the density-gradation characteristic control performed at any time.

As described above, according to this embodiment, the color image forming apparatus is notified of the detection results of the color matching chart detected by the reference color image forming apparatus to correct the variations of the color sensors so that the color reproducibility is improved among a plurality of color image forming apparatuses.

Seventh Embodiment

FIG. 14 is a flowchart showing the control for improving the color reproducibility among the color image forming apparatuses having the color sensor mounted thereon in the "color image forming apparatus system" which is the seventh embodiment. The major difference from the sixth embodiment is that the color matching chart is detected by the color sensor at the time of shipment to make the color sensor output correction table.

Steps 701 to 703 are operations to be performed when shipping the color image forming apparatus, and the steps 701 to 702 can also be performed before mounting the color sensor on the color image forming apparatus.

In the step 701, detection with the color sensor is performed concerning the color matching chart, prepared in advance, having a plurality of gray patches of K and process gray patches of CMY of the predetermined gradation which have been formed on the transfer medium.

In the step 702, the color sensor output correction table is made for converting the results detected in the step 701 into the detection results obtained when detecting the color matching chart with an ideal color sensor.

In the step 703, the color sensor output correction table made in the step 702 is stored in a nonvolatile memory device of the color image forming apparatus or the color sensor.

In the step 704, using the color sensor and the color sensor output correction table at a shipment destination, the above described fixed density-gradation characteristic controlling patch pattern 63 is formed on the transfer medium so as to control the density-gradation characteristics. On this occasion, the output value of the color sensor of the color image forming apparatus is converted into the ideal color sensor output in the color sensor output correction table, and the converted output value is used to control the density-gradation characteristics of the color image forming apparatus. Moreover, the density-gradation characteristic control performed in this step may also be the color difference gradation characteristic control from the specific type of paper.

This control is so constituted as to compare the color sensor output of all the color image forming apparatuses to be shipped with the ideal color sensor output so that the variations of the color sensors are corrected, and it is excellent in that it does not need to output a test chart after the shipment. In addition, the color matching chart is not limited to the described gray patch, but it may also be a chart of the chromatic color patch of primary to quartic colors. However, as in the sixth embodiment, the color reproducibility cannot be obtained unless the fixed density-gradation characteristic controlling patch pattern 63 formed on the above described transfer medium and the color sensor are used for the density-gradation characteristic control performed at any time.

To cope with output fluctuation of the color sensor after the shipment, it is also feasible, in the color image forming apparatus having a hygrothermal sensor, to store and use several types of color sensor output correction tables corresponding to the temperature and humidity. In addition, it is also possible to combine the control in this embodiment with that in the first embodiment.

As described above, according to this embodiment, the color matching chart is checked with the color sensor at the time of shipment to correct the variations of the color sensors, so that it can improve the color reproducibility among a plurality of color image forming apparatuses without outputting the test chart. Moreover, while the output correction table is stored in a nonvolatile memory means in this embodiment, same may also be performed as required in the other embodiments.

Eighth Embodiment

Figure 15:
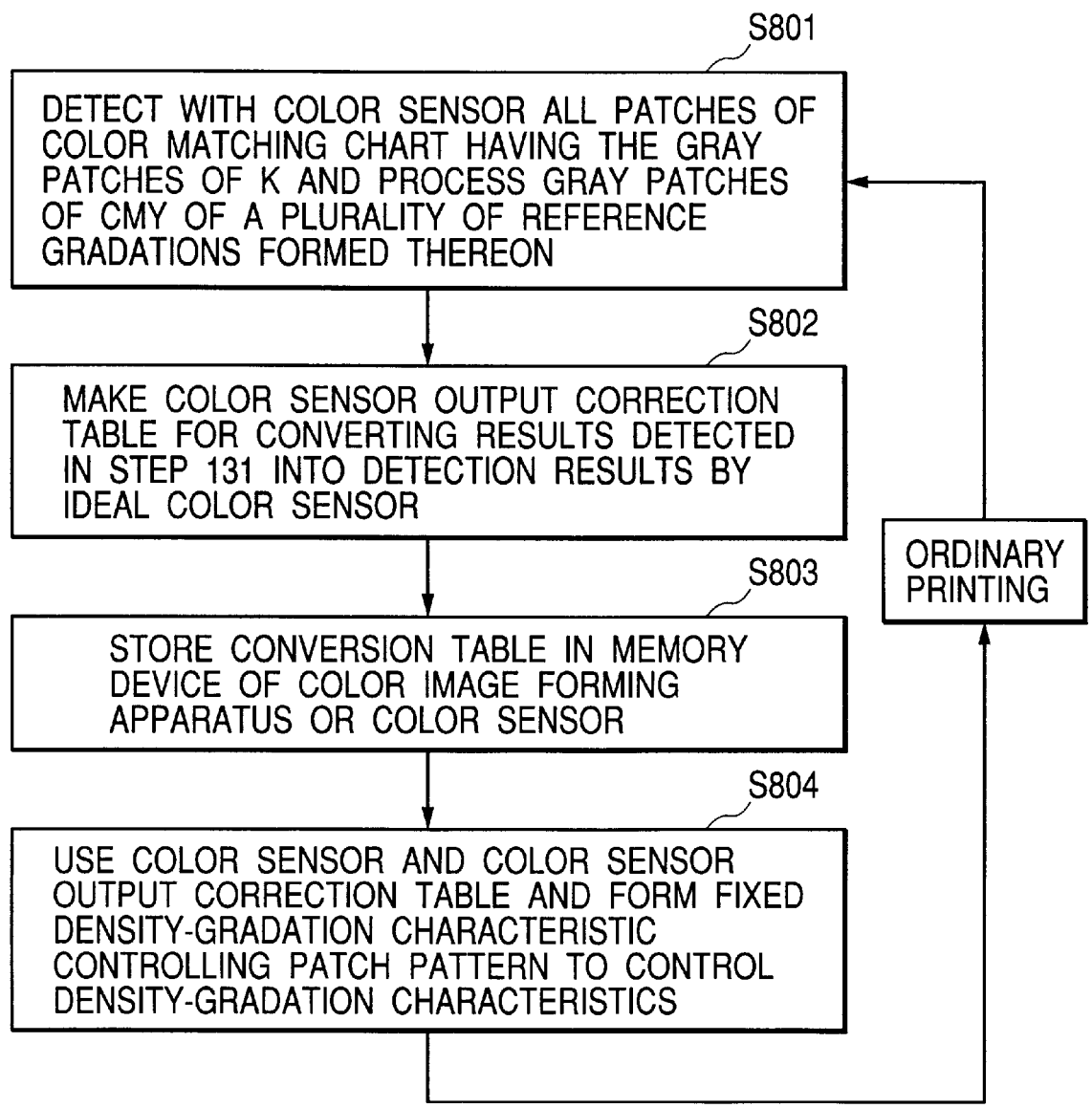
FIG. 15 is a flowchart showing control in an eighth embodiment.

FIG. 15 is a flowchart showing the control for improving the color reproducibility among the color image forming apparatuses having the color sensor mounted thereon in the "color image forming apparatus system" which is the eighth embodiment. The major difference from the seventh embodiment is that the color matching chart of the seventh embodiment is shipped along with the color image forming apparatus, the color matching chart is detected with the color sensor at the shipment destination, and the color sensor output correction table is made and renewed. This control can be carried out as many times as desired during intervals of ordinary printing operation. It is carried out by a user according to instructions in predetermined timing after detecting the environmental change, the number of sheets to be printed and so on or by user's manual operation when a user desires to do it.

In the step 801, detection with the color sensor is performed concerning the predetermined color matching chart, prepared in advance, having a plurality of gray patches of K and process gray patches of CMY of the predetermined gradient which have been formed on the transfer medium.

In the step 802, the color sensor output correction table is made for converting the results detected in the step 801 into the detection results obtained when detecting the color matching chart with the ideal color sensor.

In the step 803, the color sensor output correction table created in the step 802 is stored in the nonvolatile memory device of the color image forming apparatus or the color sensor.

In the step 804, using the color sensor and the color sensor output correction table, the above described fixed density-gradation characteristic controlling patch pattern 63 is formed on the transfer medium so as to control the density-gradation characteristics. On this occasion, the output value of the color sensor of the color image forming apparatus is converted into the ideal color sensor output in the color sensor output correction table, and the converted output value is used to control the density-gradation characteristics of the color image forming apparatus. Moreover, the density-gradation characteristic control performed in this step may also be the color difference-gradation characteristic control from the specific type of paper.

From the step 804 onward, the ordinary printing is performed, and it returns to the step 801 when carrying out this control in the aforementioned timing again.

This control is so constituted as to compare the color sensor output of all the color image forming apparatuses with the ideal color sensor output so that the variations of the color sensors are corrected, and it is excellent in that it can cope with the sensor output fluctuation after the shipment although it is necessary to bring about no difference among all the color matching charts attached to the color image forming apparatuses on and after the shipment. In addition, the color matching chart is not limited to the described gray patch, but it may also be a chart of the chromatic color patch of the primary to quartic colors. However, as in the sixth and seventh embodiments, the color reproducibility cannot be obtained unless the fixed density-gradation characteristic controlling patch pattern 63 formed on the above described transfer element and the color sensor are used for the density-gradation characteristic control performed at any time.

In addition, in the case where it is desired to match the colors among a plurality of specific color image forming apparatuses, one sheet may be selected from the color matching charts each of which is attached to each of the above described color image forming apparatuses and the same color matching chart as the selected one sheet is detected by the color sensors of the color image forming apparatuses to make the color sensor output correction tables of the color image forming apparatuses. Thus, the control can be carried out without being influenced by color variations among the color matching charts.

As described above, according to this embodiment, the color matching chart is attached at the time shipment and detected at any time of correcting the variations of the color sensors, so that the color reproducibility can be improved among a plurality of color image forming apparatuses.

As described above, improvement can be made on the color reproducibility among a plurality of color image forming apparatuses.

What is claimed is:

1. An image forming apparatus comprising:
   an image forming unit that forms images of an achromatic colorant and a plurality of chromatic colorants and superimposes the images to form a color image;
   a patch forming unit that has said image forming unit form a gray patch of said chromatic colorants and a gray patch of said achromatic colorant;
   a detecting unit that detects a chromaticity of the gray patch formed of said chromatic colorants and a chromaticity of the gray patch formed of said achromatic colorant using a color sensor;
   a comparing unit that compares a detection result of a chromaticity of the gray patch formed of said chromatic colorants with a detection result of a chromaticity of the gray patch formed of said achromatic colorant; and
   a controlling unit that controls an image forming condition of said image forming unit on the basis of the comparison result of said comparing unit.

2. The image forming apparatus according to claim 1, wherein said chromatic colorants comprise yellow, magenta and cyan.

3. The image forming apparatus according to claim 1, wherein in a case where the comparison result shows that both the chromaticities are approximately equal to each other, lightness of the gray patch formed of said chromatic colorants is judged to be equal to that of the gray patch formed of said achromatic colorant.

4. The image forming apparatus according to claim 1, further comprising a calculating unit that calculates a mixing ratio of said chromatic colorants on the basis of detection results of said detecting unit.

5. The image forming apparatus according to claim 1, further comprising a correcting unit that corrects a calibration table of said image forming apparatus on the basis of detection results of said detecting unit.

6. The image forming apparatus according to claim 1, wherein each of the gray patch formed of said chromatic colorants and the gray patch formed of said achromatic colorant is formed in a plurality of different gradations.

7. The image forming apparatus according to claim 1, further comprising an estimating unit that estimates the chromaticity of a gray patch of another gradation on the basis of the chromaticity of the gray patch formed of said achromatic colorant.

8. The image forming apparatus according to claim 7, wherein said color sensor outputs a plurality of color separation signals.

9. The image forming apparatus according to claim 8, wherein said comparing unit compares the detection results for every color separation signal output from said color sensor.

10. The image forming apparatus according to claim 1, wherein said color sensor outputs a plurality of color separation signals.

11. The image forming apparatus according to claim 10, wherein said comparing unit compares the detection results for every color separation signal output from said color sensor.

12. An adjustment method for the image forming apparatus according to claim 1, comprising:
    a step of detecting the chromaticity of a reference patch by using the color sensor included in said image forming apparatus; and
    a correcting step of correcting an output table of said color sensor on the basis of the detected chromaticity.

13. The adjustment method according to claim 12, wherein said reference patch is formed by another image forming apparatus.

14. The adjustment method according to claim 12, wherein said reference patch is an ideal patch.

15. The adjustment method according to claim 12, wherein said reference patch is shipped as an attachment to the apparatus.

16. An adjustment method for an image forming apparatus according to claim 1, said method comprising:
    a step of having a reference image forming apparatus form a gray patch of said chromatic colorants and a gray patch of said achromatic colorant;
    a step of detecting a chromaticity of the gray patch formed of said chromatic colorants and a chromaticity of the gray patch formed of said achromatic colorant on said reference image forming apparatus by using a color sensor included in said image forming apparatus;
    a step of having said image forming apparatus form a gray patch of said chromatic colorants and a gray patch of said achromatic colorant;
    a step of detecting a chromaticity of the gray patch formed of said chromatic colorants and a chromaticity of the gray patch formed of said achromatic colorant on said image forming apparatus by using the color sensor included in said image forming apparatus; and
    a step of adjusting an image forming condition for said image forming apparatus on the basis of the detection results of said detecting steps.

17. The image farming apparatus according to claim 1, wherein said color sensor is placed on a downstream side of a fixing unit comprised in the apparatus.

18. An adjustment method for an image forming apparatus forming images of an achromatic colorant and a plurality of chromatic colorants and superimposing the images to form a color image, comprising:
    a step of having said image forming apparatus form a gray patch of said chromatic colorants and a gray patch of said achromatic colorant;
    a step of detecting a chromaticity of the gray patch formed of said chromatic colorants and a chromaticity of the gray patch formed of said achromatic colorant using a color sensor;
    a step of comparing the chromaticity of the gray patch formed of said chromatic colorants with the chromaticity of the gray patch formed of said achromatic colorant; and
    a step of controlling an image forming condition of said image forming apparatus on the basis of the comparison result.

19. An adjustment method for an image forming apparatus forming images of an achromatic colorant and a plurality of chromatic colorants and superimposing the images to form a color image, the method comprising:
    a step of having a reference image forming apparatus form a gray patch of said chromatic colorants and a gray patch of said achromatic colorant;
    a step of detecting a chromaticity of the gray patch formed of said chromatic colorants and a chromaticity of the gray patch formed of said achromatic colorant respectively on said reference image forming apparatus by using a color sensor included in said image forming apparatus;
    a step of having said image forming apparatus form a gray patch of said chromatic colorants and a gray patch of said achromatic colorant;

a step of detecting a chromaticity of the gray patch formed of said chromatic colorants and a chromaticity of the gray patch formed of said achromatic colorant respectively on said image forming apparatus by using the color sensor included in said image forming apparatus; and a step of adjusting an image forming condition for said image forming apparatus on the basis of the detection results of said detecting steps.

20. An image forming apparatus comprising:

an image forming unit that forms images of an achromatic colorant and a plurality of chromatic colorants and superimposes the images to form a color image;

a patch forming unit that has said image forming unit form a gray patch of said chromatic colorants and a gray patch of said achromatic colorant;

a detecting unit that detects the gray patch formed of said chromatic colorants and the gray patch formed of said achromatic colorant using a color sensor; and a controlling unit that controls an image forming condition of said image forming unit on the basis of the detection result by said detecting unit, so that a chromaticity of a gray patch formed of said chromatic colorants corresponds to a chromaticity of a gray patch formed of said achromatic colorant.

21. The image forming apparatus according to claim 20, wherein said chromatic colorants comprise yellow, magenta and cyan.

22. The image forming apparatus according to claim 20, wherein in a case where the detection result shows that both the chromaticities are approximately equal to each other, lightness of the gray patch formed of said chromatic colorants is judged to be equal to that of the gray patch formed of said achromatic colorant.

23. The image forming apparatus according to claim 20, further comprising a calculation unit that calculates a mixing ratio of said chromatic colorants on the basis of the detection results.

24. The image forming apparatus according to claim 20, further comprising a correction unit that corrects a calibration table of said image forming apparatus on the basis of the detection results.

25. The image forming apparatus according to claim 20, wherein each of the gray patch formed of said chromatic colorants and the gray patch formed of said achromatic colorant is formed in a plurality of different gradations.

26. The image forming apparatus according to claim 20, further comprising an estimation unit that estimates the chromaticity of a gray patch of another gradation on the basis of the chromaticity of the gray patch formed of said achromatic colorant.

27. An adjustment method for an image forming apparatus according to claim 20, said method comprising:

a step of having a reference image forming apparatus form a gray patch of said chromatic colorants and a gray patch of said achromatic colorant;

a step of detecting the gray patch formed of said chromatic colorants and the gray patch formed of said achromatic colorant on said reference image forming apparatus by using a color sensor included in said image forming apparatus;

a step of having said image forming apparatus form a gray patch of said chromatic colorants and a gray patch of said achromatic colorant;

a step of detecting the gray patch formed of said chromatic colorants and the gray patch formed of said achromatic colorant on said image forming apparatus by using the color sensor included in said image forming apparatus; and a step of adjusting an image forming condition for said image forming apparatus on the basis of the detection results of said detecting steps.

28. An adjustment method for the image forming apparatus according to claim 20, comprising:

a step of detecting a reference patch by using the color sensor included in said image forming apparatus; and a correcting step of correcting an output table of said color sensor on the basis of a detected chromaticity.

29. The adjustment method according to claim 28, wherein said reference patch is formed by another image forming apparatus.

30. The adjustment method according to claim 28, wherein said reference patch is an ideal patch.

31. The adjustment method according to claim 28, wherein said reference patch is shipped as an attachment to the apparatus.

32. The image forming apparatus according to claim 20, wherein said color sensor is placed on a downstream side of a fixing unit comprised in the apparatus.

33. An adjustment method for an image forming apparatus forming images of an achromatic colorant and a plurality of chromatic colorants and superimposing the images to form a color image, comprising:

a step of having said image forming apparatus form a gray patch of said chromatic colorants and a gray patch of said achromatic colorant;

a step of detecting the gray patch formed of said chromatic colorants and the gray patch formed of said achromatic colorant using a color sensor; and a step of controlling an image forming condition of said image forming apparatus on the basis of the detection result, so that a chromaticity of a gray patch formed of said chromatic colorants corresponds to a chromaticity of a gray patch formed of said achromatic colorant.

* * * * *

UNITED STATES PATENT AND TRADEMARK OFFICE
CERTIFICATE OF CORRECTION

PATENT NO. : 6,853,815 B2
DATED : February 8, 2005
INVENTOR(S) : Hiroki Tezuka et al.

It is certified that error appears in the above-identified patent and that said Letters Patent is hereby corrected as shown below:

Column 11,
Line 31, "value" should read -- values --.

Column 18,
Line 66, "time shipment" should read -- time of shipment --.

Column 20,
Line 30, "farming" should read -- forming --.

Signed and Sealed this

Twenty-eighth Day of June, 2005

JON W. DUDAS
*Director of the United States Patent and Trademark Office*